(12) United States Patent
Cambon

(10) Patent No.: US 6,378,804 B1
(45) Date of Patent: Apr. 30, 2002

(54) AIRCRAFT WING STRUCTURE PROFILED SUSPENSION PYLON

(75) Inventor: Jean-Louis Cambon, La Salvetat Saint Gilles (FR)

(73) Assignee: Aerospatiale Matra Airbus, Paris (FR)

( * ) Notice: Subject to any disclaimer, the term of this patent is extended or adjusted under 35 U.S.C. 154(b) by 0 days.

(21) Appl. No.: 09/697,072

(22) Filed: Oct. 27, 2000

(30) Foreign Application Priority Data

Dec. 27, 1999 (FR) .............................. 99 16539

(51) Int. Cl.⁷ .............................................. B64D 27/12
(52) U.S. Cl. ............................................ 244/54; 244/130
(58) Field of Search ..................... 244/53 R, 54, 244/124, 130, 55, 536; D12/340, 341

(56) References Cited

U.S. PATENT DOCUMENTS

| | | | |
|---|---|---|---|
| 3,960,345 A | * 6/1976 | Lippert, Jr. ................ | 244/130 |
| 4,067,518 A | 1/1978 | Paterson et al. | |
| 4,712,750 A | 12/1987 | Ridgwell | |
| 4,867,394 A | 9/1989 | Patterson, Jr. | |
| 5,102,069 A | * 4/1992 | Hackett et al. ............... | 244/54 |

FOREIGN PATENT DOCUMENTS

EP 0432972 6/1991

* cited by examiner

Primary Examiner—Peter M. Poon
Assistant Examiner—Timothy D Collins
(74) Attorney, Agent, or Firm—Stevens, Davis, Miller & Mosher, LLP

(57) ABSTRACT

According to the invention, the suspension pylon (3) comprises a fairing for reducing the local loss in lift and its maximum-width section (7) is located at the front of the concave and set-back rear part (4R) of the pressure face (4) of the wing structure (1). The fairing for reducing the local loss in lift (8):

is housed, at least over most of its height, in the concavity of said rear part (4R) of the pressure face (4) of the wing structure (1), and comprises an underside (15) which comes close to its upper surface (13) as an aerodynamic continuation of the suction face (14) of the wing structure (1) so as to give the protruding rear part (12) of said fairing (8) the shape of a blade which tapers toward the rear and ends in an aerodynamic trailing edge (16).

8 Claims, 6 Drawing Sheets

AIRCRAFT WING STRUCTURE PROFILED SUSPENSION PYLON

SUMMARY OF THE INVENTION

The present invention relates to an aircraft wing structure profiled suspension pylon.

It is known that certain aircraft comprise profiled pylons suspended from their wing structure and projecting from the pressure face thereof. Such pylons are intended for suspending devices such as engines, weaponry, fuel tanks, etc., under the wing structure.

Naturally, these pylons and the devices suspended from them give rise to disturbances in the aerodynamic flow over the wing structure and this locally results in a loss of lift and an increase in drag. These unfavorable aerodynamic effects are moreover worsened because, for structural reasons in particular, said pylons are, on the one hand, relatively wide and, on the other hand, have their trailing edge in the vicinity of the trailing edge of the wing structure, such trailing-edge proximity increasing the risks of airstream detachment.

DESCRIPTION OF THE PRIOR ART

To overcome these drawbacks, the airbus A320 has, from as early as 1986, been using a fairing for reducing the local loss in aerodynamic lift due to such a suspension pylon; this fairing (which is described, for example, in EP-A-0 432 972) being arranged in contact with the pressure face of said wing structure and extending, on the one hand, heightwise, over part of said pylon and, on the other hand, toward the rear of the wing, as a continuation beyond the trailing edge thereof. A known fairing such as this has the approximate shape of a right parallelepiped ending at the rear in a rounded-vertex pyramid. The upper surface of the fairing, projecting beyond the trailing edge of the wing structure, continues the suction face thereof and the width of the said fairing corresponds to the maximum width of said pylon, which means that the lateral faces of said fairing extend the maximum-width section of said pylon rearward.

For a medium-sized airplane, this known fairing is of acceptable dimensions. However, for a large-sized airplane it is necessarily lengthy and bulky, which gives rise to heavy aerodynamic loadings exerted on said fairing in flight. This entails stiffening it, which results in a penalizing increase in mass.

Furthermore, when the wing structure has mobile trailing-edge elements, such as wing flaps, this fairing has itself to be mobile. In this case, for certain flight configurations, the fairing may find itself at least partially in the hot air jet from an engine (the temperature of which may be as high as 700° C.), which means that it then has to be made of heat-resistant materials and designed to withstand these high temperatures. This then results in mass constraints and additional production costs.

SUMMARY OF THE INVENTION

The object of the present invention is to overcome these drawbacks.

To this end, according to the invention, the aircraft wing structure suspension pylon, said wing structure comprising a pressure face, the rear part of which is concave and set back with respect to its front part and said pylon:

being suspended from said wing structure, projecting with respect to said pressure face of the wing structure and being profiled to comprise, between its leading edge and its trailing edge, a section of maximum width; and being equipped with a fairing for reducing the local loss of aerodynamic lift, which:

is placed in contact with the pressure face of said wing structure and extends heightwise over part of said pylon;

extends toward the rear of the wing structure, with lateral faces in aerodynamic continuation of the maximum-width section of said pylon; and extends toward the rear of the wing structure, beyond the trailing edge thereof, in the form of a projecting rear part with an upper surface in aerodynamic continuation of the suction face of said wing structure, is noteworthy in that:

said maximum-width section of said pylon is arranged at the front of said concave and set-back rear part of the pressure face of the wing structure; and said fairing for reducing the local loss in aerodynamic lift:

is housed, at least over most of its height, in the concavity of said rear part of the pressure face of the wing structure, and comprises an underside which comes close to said upper surface, in aerodynamic continuation of the suction face of the wing structure so as to give said projecting part of said fairing the shape of a blade which tapers toward the rear and ends in an aerodynamic trailing edge.

Thus, by virtue of the present invention, a flat small-sized fairing is obtained which is able to solve the abovementioned problems of the known fairing. It will be noted that the aerodynamic trailing edge of said faring makes it possible to considerably reduce the length of the part thereof which projects beyond the trailing edge of the wing structure for aerodynamic efficiency of the same order. Experience has shown that the present invention makes it possible to reduce the height of the fairing by about 80% and to reduce the length of said projecting part thereof by about 50%, with respect to this known fairing, for essentially equal aerodynamic efficiency with respect to the risk of airstream detachment at the trailing edge of the pylon and with respect to loss-of-lift problems. Such a reduction in the dimensions therefore makes it possible to avoid the mass and bulkiness drawbacks mentioned hereinabove and, in the case of a mobile fairing near to the hot jet from an engine, makes it possible to reduce the constraints on the design and the kinds of material to use.

In order to further improve the limitation on the thickness of the fairing according to the present invention, it is advantageous for its underside to be concave.

As regards the trailing edge of the rear part of the fairing, the present invention envisages a number of embodiments. For example:

the lateral faces of the projecting rear part of the fairing may, just like those of that part of the fairing facing the pressure face, be at least approximately parallel to one another, in the continuation of the maximum-width section of the pylon. In this case, the trailing edge of the fairing is elongate, for example rectilinear, and may be at least roughly parallel to the local trailing edge of the wing structure;

or alternatively, as an alternative variation, the lateral faces of the projecting rear part of the fairing may, unlike those of the part of the fairing facing the pressure face, converge toward each other in the direction of the rear. In this case, said lateral faces may be convex and may define, for said fairing, either a relatively elongate, for example rectilinear, trailing edge, or a trailing edge which is at least essentially localized to a point.

Whatever the embodiment of the trailing edge of the fairing, it goes without saying that it is necessary to make sure that the shape of the projecting rear part thereof does not give rise to airstream detachments which would increase drag.

Furthermore, in order to avoid the projecting rear part of the fairing according to the present invention being submerged in the viscous effects of the boundary layer in the vicinity of the trailing edge of the wing structure (which would appreciably reduce the aerodynamic efficiency of said fairing), it is important that, at said trailing edge of the wing structure, the thickness of said fairing be greater than the thickness of the boundary layer of the aerodynamic flow over said wing structure.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENTS

Figure 1:
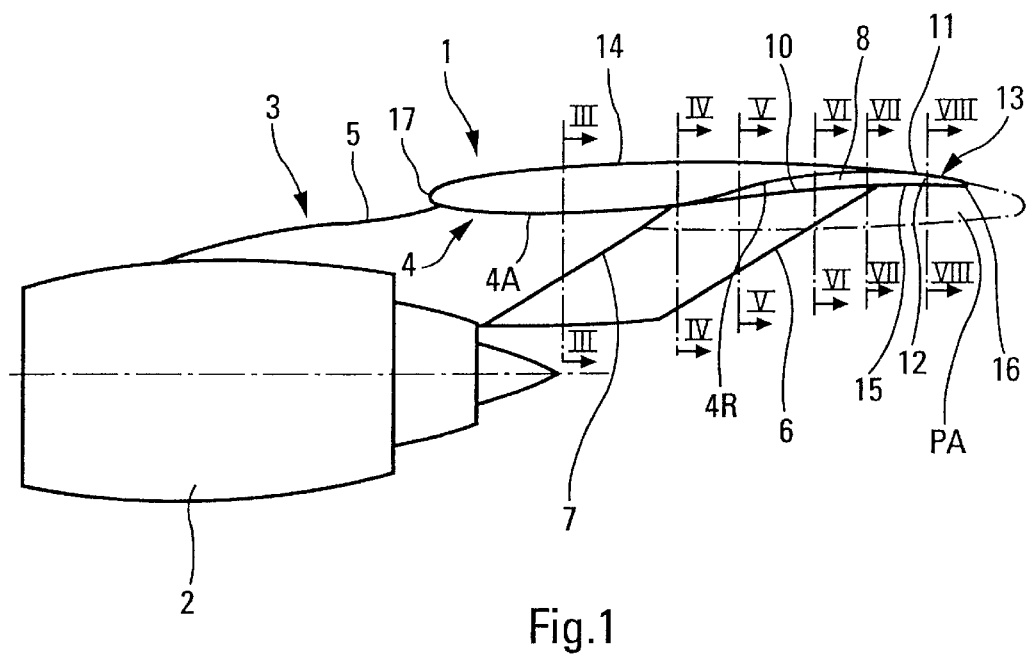
FIGS. 1 and 2 respectively show, in a view from the side and in a view from above, a schematic example of a suspension pylon according to the present invention, intended to support an engine under the wing structure of an airplane.
Figure 2:
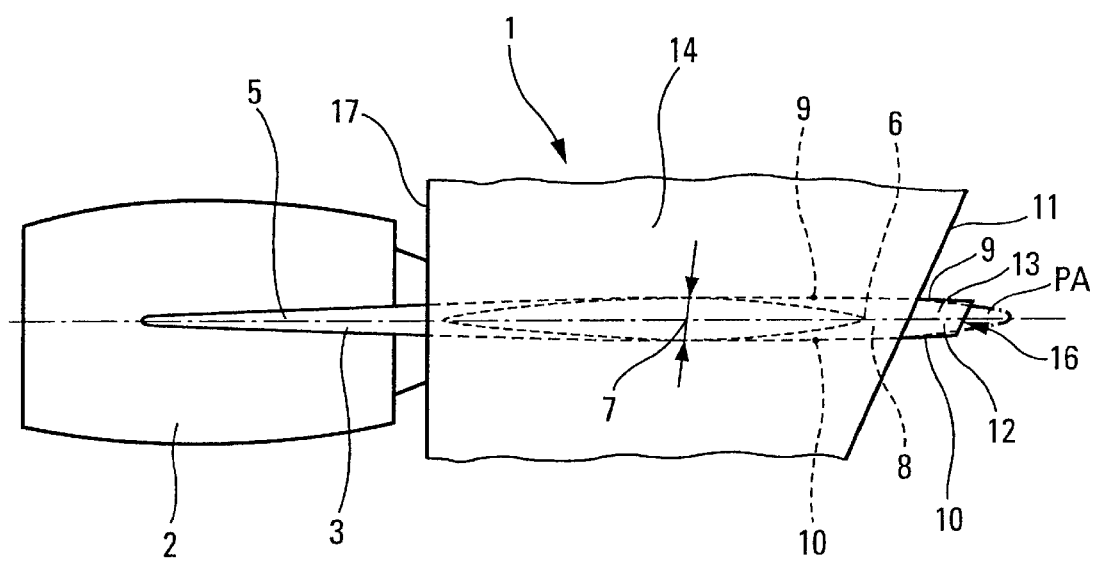
Figure 3:
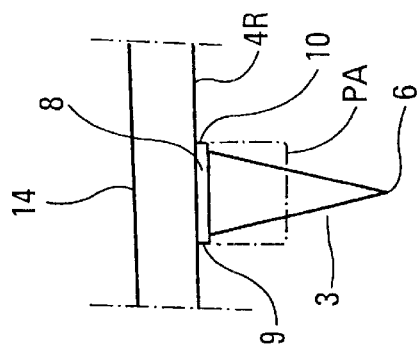
FIGS. 3 to 8 are enlarged sectional views corresponding, respectively, to the section lines III—III to VIII—VIII of FIG. 1.
Figure 4:
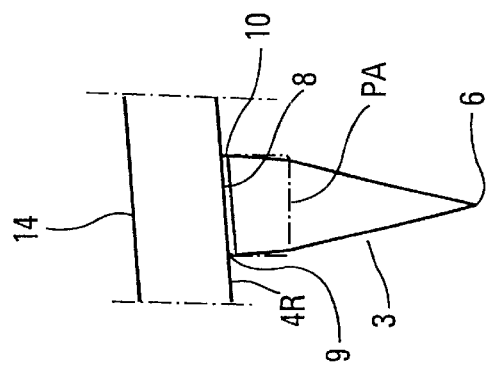
Figure 5:
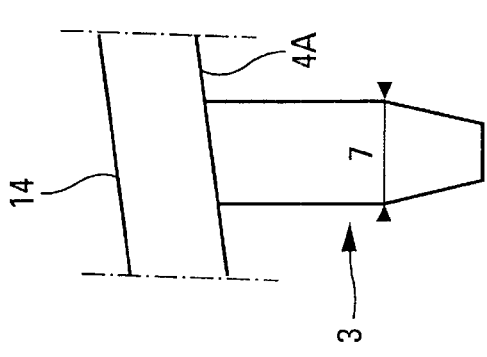
Figure 6:
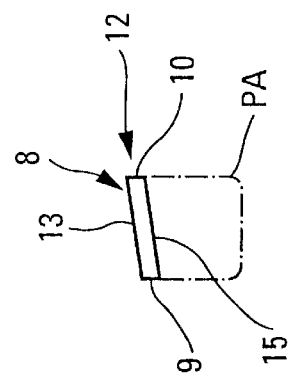
Figure 7:
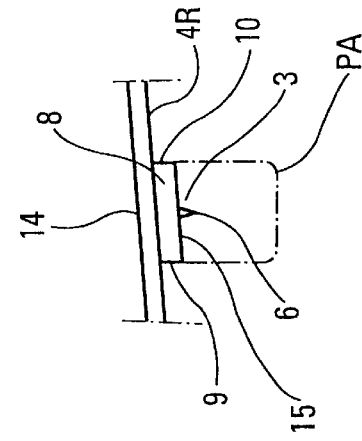
Figure 8:
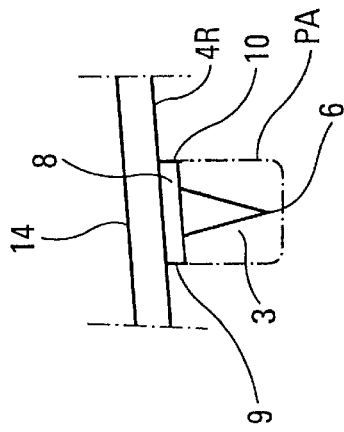
Figure 9:
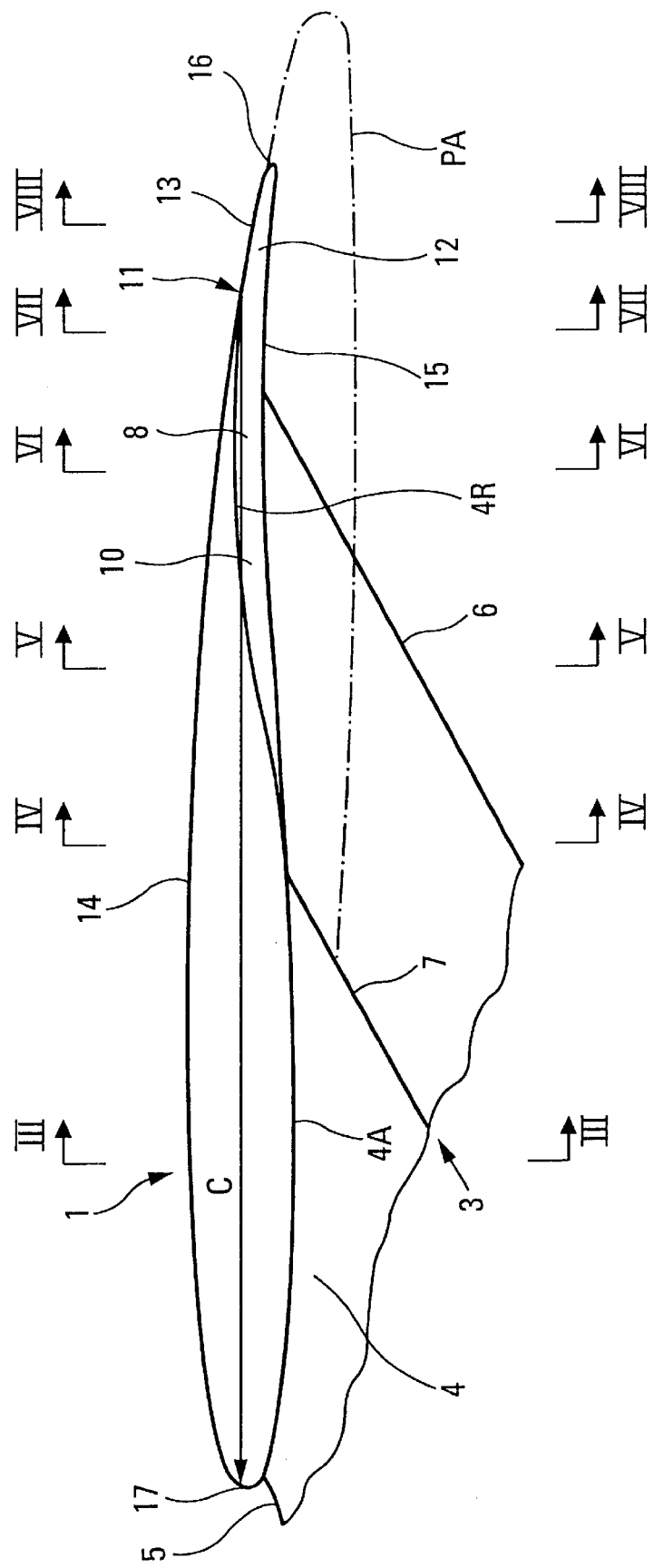
FIG. 9 shows, on a larger scale, the upper part of FIG. 1.

FIGS. 1 and 2 depict a portion of the wing structure 1 of an airplane, in the vicinity of an engine 2 thereof. This engine 2 is suspended from the wing structure 1 by a suspension pylon 3 which projects from the pressure face 4 of the wing structure 1. As can be seen in FIG. 1, and also in FIG. 9, the wing structure 1 comprises a front part (on the same side as the leading edge 17) which is thick, and a rear part (on the same side as the trailing edge 11) which is thin, because the pressure face 4 has a rear part 4R which is concave and set back with respect to its front part 4A.

The suspension pylon 3, itself suspended from the wing structure 1 in a known way which has not been depicted, is profiled and comprises a leading edge 5 and a trailing edge 6 and, between these, a maximum-width section 7. (The width of the pylon 3 is that dimension thereof which is at least roughly parallel to the wing span of the wing structure 1, that is to say orthogonal to the plane of FIGS. 1 and 9. In the example depicted in the figures, the section 7 is not vertical, but is steeply inclined forward, from the top downward. Moreover, said maximum-width section 7 of the pylon 3 is arranged forward of the concave and set-back rear part 4R of the pressure face 4 of the wing structure 1.

In addition, the suspension pylon 3 is equipped with a fairing 8 (see also FIGS. 4 to 13), intended to reduce the local loss of lift and the local increase in drag which are caused by the pylon 3. This fairing 8 is flat and arranged in contact with the pressure face 4 of the wing structure 1, extending only over a short part of the height of said pylon 3. More specifically, the pylon 8 is housed, at least for most of its height, in the concavity of the rear part 4R of the pressure face 4 of the wing structure 1.

The flat fairing 8 extends toward the rear of the wing structure 1 with parallel lateral faces 9 and 10 in continuation of the maximum-width section 7 of the pylon 3 and continues to the rear of the wing structure 1, beyond the trailing edge 11 thereof, in a projecting part 12, the upper surface 13 of which is in the continuation of the suction face 14 of the wing structure 1.

In addition, the underside 15 of the fairing 8, at least in its rear part, is concave and comes toward the upper face 13 to give said projecting rear part 12 the shape of a blade which tapers toward the rear and ends in a leading edge 16.

Figure 10:
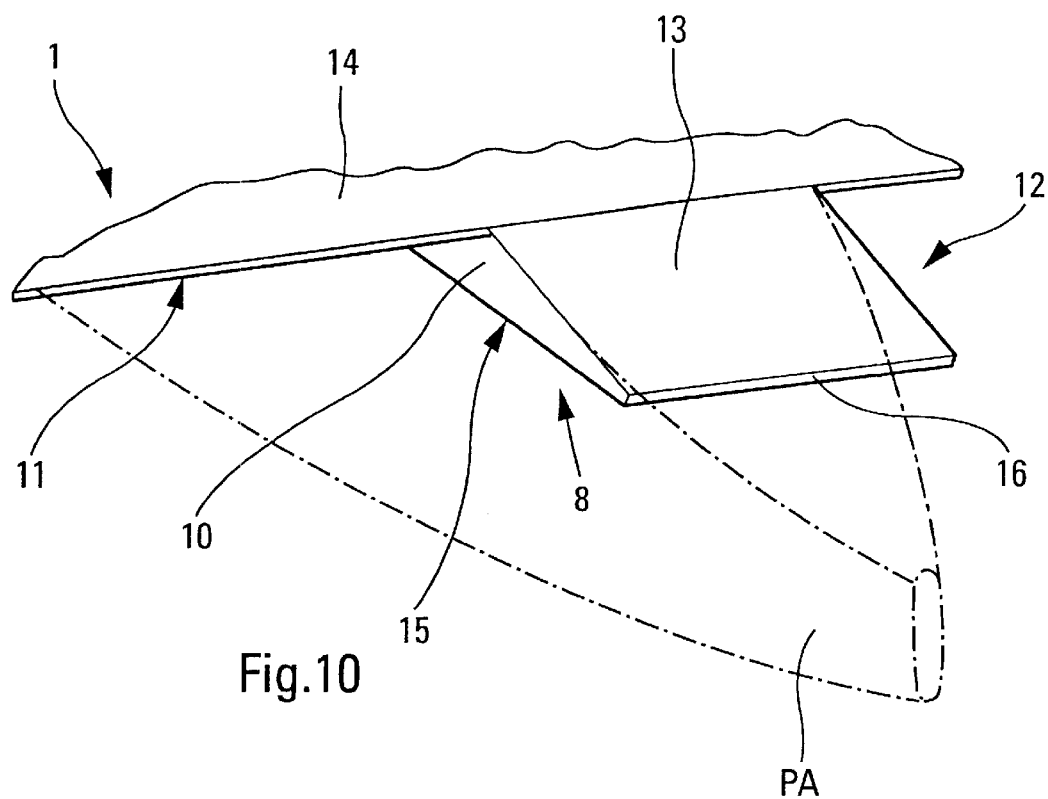
FIG. 10 is a part view, in perspective from the rear and from above, of the embodiment of the projecting rear part of the fairing which is illustrated in FIGS. 1 and 9.
Figure 11:
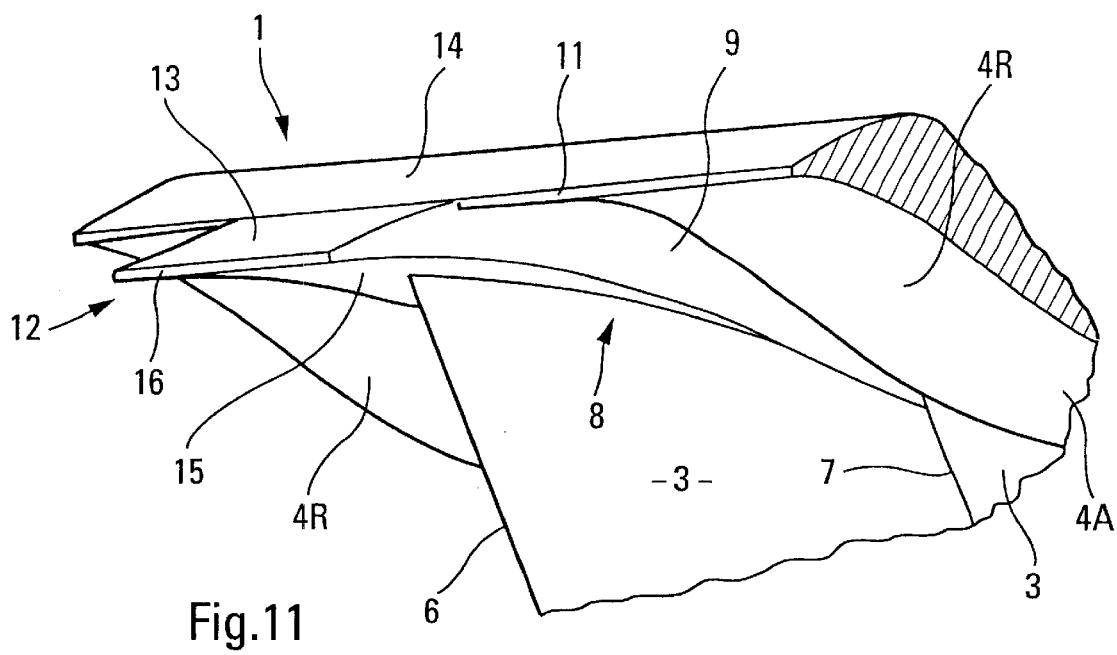
FIG. 11 is a part view, in perspective from the rear and from below, of the embodiment of FIG. 10.

In the embodiment of the fairing 8 illustrated in FIGS. 2 to 11, the lateral faces 9 and 10 remain mutually parallel, in continuation of the section 7, even in the projecting rear part 12 of said fairing 8. What this means is that the corresponding trailing edge 16 of this rear part 12 is elongate, and even rectilinear in the example depicted. As illustrated in FIGS. 2, 10 and 11, the rectilinear trailing edge 16 is then advantageously parallel to the local trailing edge 11 of the wing structure 1.

Figure 12:
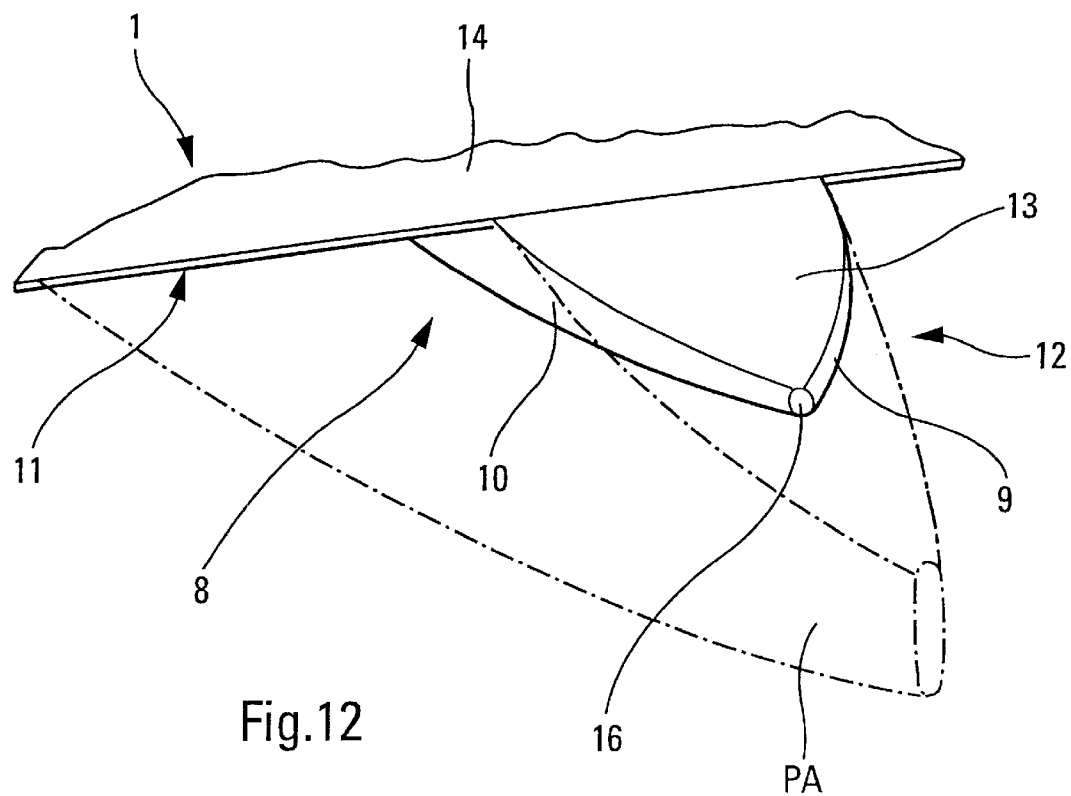
FIG. 12 is a part view, in perspective from the rear and from above, of an alternative form of embodiment of the rear part of the fairing according to the present invention.
Figure 13:
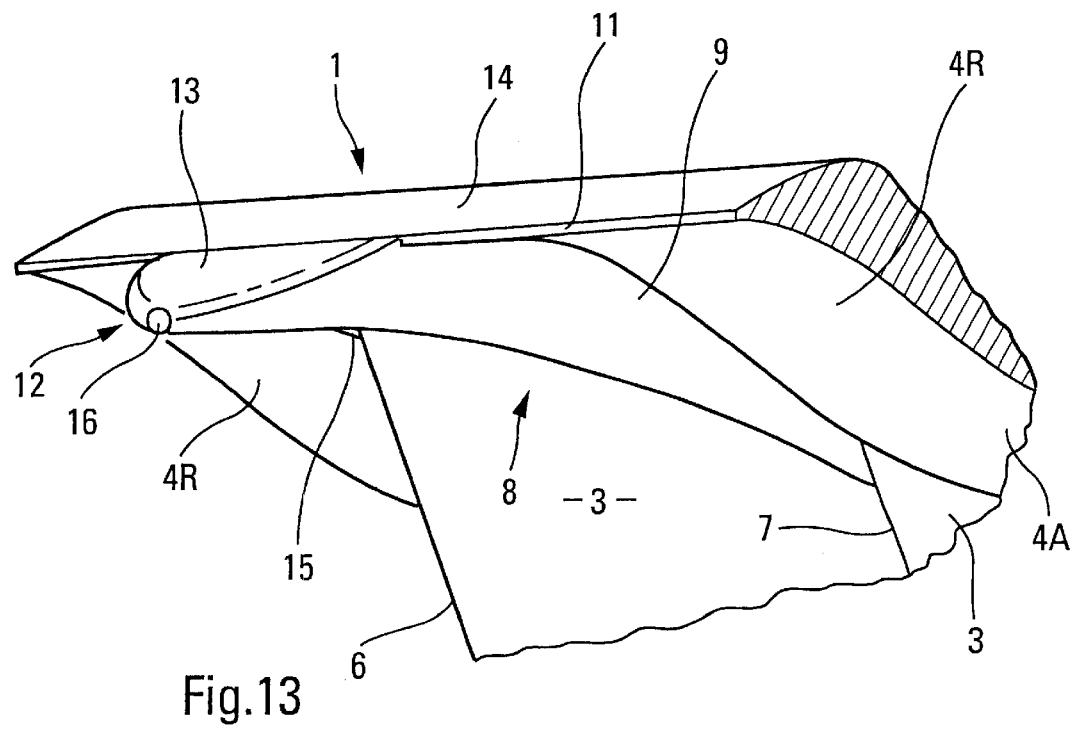
FIG. 13 is a part view, in perspective from the rear and from below, of the embodiment of FIG. 12.

By contrast, in the alternative form of embodiment of FIGS. 12 and 13, the lateral faces 9 and 10 are mutually parallel and in continuation of the section 7 in that part of the fairing 8 which is in contact with the rear part 4R of the pressure face 4, but converge toward each other toward the rear in the projecting rear part 12 beyond the trailing edge 11 of the wing structure 1. In the example depicted in FIGS. 12 and 13, the faces 9 and 10 are convex in their converging rear parts and define a trailing edge 16 which is at least essentially localized to a point. Of course, the converging rear parts of the faces 10 and 11 could be not convex, and the trailing edge 16 that they delimit could be elongate and, for example, rectilinear.

Thanks to the present invention there is thus obtained a fairing 8 which is particularly flat and has a particularly small bulk. In FIGS. 1, 2, 4 to 10 and 12, chain line has been used to depict the outlines of the known fairing PA, which would need to be provided for the wing structure 1, for equivalent aerodynamic efficiency with respect to the risk of airstream detachment at the trailing edge of the pylon and problems of loss of lift.

Figure 14:
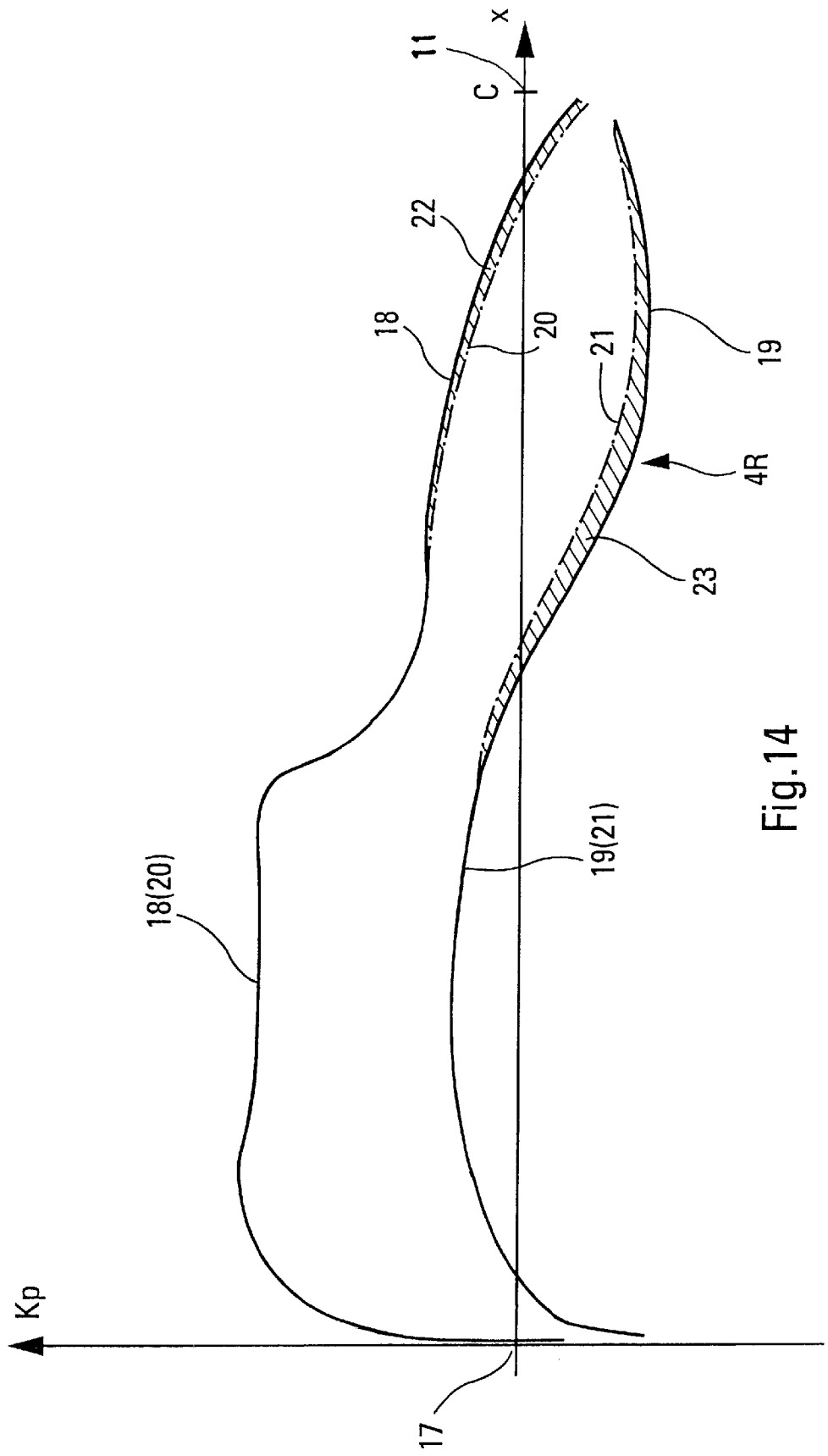
FIG. 14 is a diagram illustrating the aerodynamic action of the fairing according to the present invention.

Furthermore, FIG. 14 depicts, as a function of the distance x along the chord C of the profile of the wing structure 1, measured from the leading edge 17 toward the trailing edge 11, the curve 18 representing the variation in the pressure coefficient Kp on the suction face 14, and the curve 19 representing the variation in said coefficient Kp on the pressure face 4, for the pylon 3—wing structure 1 assembly equipped with the fairing 8 described hereinabove. By way of comparison, the same curves 20 and 21 have also been plotted in this figure for said pylon 3—wing structure assembly 1 from which said fairing 8 has been omitted. It can easily be seen that, by virtue of the fairing 8 of the invention, the lift of said assembly is increased, in the rear part 4R of the pressure face, in a proportion which corresponds to the sum of the hatched zones 22 and 23 depicted in FIG. 14.

What is claimed is:

1. An aircraft wing structure suspension pylon arrangement including a wing structure having a leading edge and a trailing edge and a pylon having a leading edge and a trailing edge, said wing structure comprising a pressure face and a suction face, said pressure face having a front part and rear part which is concave and set back with respect to said front part of said pressure face, and said pylon:

being suspended from said wing structure, projecting with respect to said pressure face of the wing structure and being profiled to comprise, between said leading edge of said pylon and said trailing edge of said pylon, a section of maximum width; and being equipped with a fairing for reducing the local loss of aerodynamic lift, said fairing having a rear part, which:

is placed in contact with the pressure face of said wing structure and extends heightwise over part of said pylon, extends toward a rear of the wing structure, with lateral faces in aerodynamic continuation of the section of maximum width of said pylon, and extends toward the rear part of the wing structure, beyond the trailing edge of the wing structure, in the form of a projecting rear part with an upper surface in aerodynamic continuation of the suction face of said wing structure, wherein:

said section of maximum width of said pylon is arranged at the front of said concave and set-back rear part of the pressure face of the wing structure; and said fairing for reducing a local loss of aerodynamic lift:

is housed, at least over most of the height of said fairing, in said concave and set-back rear part of the pressure face of the wing structure, and comprises an underside which comes close to said upper surface, in aerodynamic continuation of the suction face of the wing structure so as to give said projecting rear part of said fairing the shape of a blade which tapers toward the rear and ends in an aerodynamic trailing edge.

2. The suspension pylon as claimed in claim 1, wherein said underside of said fairing is concave.

3. The suspension pylon as claimed in claim 1, wherein the lateral faces of said rear part of the fairing are at least approximately in the continuation of the maximum-width section of said pylon.

4. The suspension pylon as claimed in claim 1, wherein the lateral faces of said rear part of the fairing converge in the rearward direction.

5. The suspension pylon as claimed in claim 3, wherein the aerodynamic trailing edge of said rear part of the fairing is elongate.

6. The suspension pylon as claimed in claim 4, wherein the aerodynamic trailing edge of said rear part of the fairing is at least essentially localized to a point.

7. The suspension pylon as claimed in claim 5, wherein said aerodynamic trailing edge of said rear part of the fairing is at least roughly parallel to the local trailing edge of the wing structure.

8. The suspension pylon as claimed in claim 4, wherein said lateral faces of said rear part of the fairing are convex.

* * * * *